US008126695B2

(12) United States Patent  
Dheenathayalan et al.

(10) Patent No.: US 8,126,695 B2  
(45) Date of Patent: Feb. 28, 2012

(54) SYSTEMS AND METHODS FOR EVENT BASED EXECUTION OF FIELDBUS PROCESS CONTROL STRATEGIES

(75) Inventors: Prabu Dheenathayalan, Coimbatore (IN); Kolavi Mahadevappa Shashi Kumar, Bangalore (IN); Karanam Sathyanarayan Rao Thippamma Vanisri, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 610 days.

(21) Appl. No.: 12/266,017

(22) Filed: Nov. 6, 2008

(65) Prior Publication Data

US 2010/0114347 A1    May 6, 2010

(51) Int. Cl.
*G06F 17/50* (2006.01)
(52) U.S. Cl. ............................................. 703/13
(58) Field of Classification Search ...................... 703/13
See application file for complete search history.

(56) References Cited

U.S. PATENT DOCUMENTS

| 5,971,581 | A  | * | 10/1999 | Gretta et al. ..................... 700/83 |
| 6,304,934 | B1 | * | 10/2001 | Pimenta et al. ................ 710/305 |
| 2004/0078182 | A1 | * | 4/2004 | Nixon et al. ..................... 703/22 |

* cited by examiner

*Primary Examiner* — Dwin M Craig
(74) *Attorney, Agent, or Firm* — Jetter & Associates, P.A.

(57) ABSTRACT

Systems (200, 230, 240) and methods (400) for event based execution of a Fieldbus process control strategy (FPCS) for simulation of an industrial process at least partially implemented by a Fieldbus system including a FIM (114, 116, 212, 214, 232, 234) and a field device (122, 124). The methods involve representing an implementation of the FPCS (702) as a Fieldbus data structure (FDS) comprising operational blocks (802, ..., 818) representing operations of the FIM and a field device. The methods also involve creating a Link Active Schedule (LAS) using the FDS. The LAS (706) schedules software operations for simulating the field device operations. The methods further involve running simulation software installed on a computing device (222, 226, 232, 234, 242) for simulating the field device operations. The simulation software is configured for performing functional block executions of the software implementations identified and scheduled in the LAS.

15 Claims, 15 Drawing Sheets

| Operation Identifiers 602 | Operation Description 604 |
|---|---|
| AI Operation (Performed by FF Device) | 1. Generate an analog input signal representing a sensed/measured value; and 2. Communicate the analog input signal from a sensor/gauge of an FF device to a processor of the FF device. |
| AIA_3 Operation (Performed by FF Device) | Process the analog input signal to place the sensed/measured value in an H1 link format suitable for communication from an FF device to a FIM over an H1 link. |
| AI.OUT Operation (Performed by FF Device) | Write the sensed/measured value in the H1 link format to an H1 link Buffer of the FF Device. |
| AI_Agent Operation (Performed by FIM) | 1. Read the sensed/measured value from the H1 Buffer of the FF Device; 2. Process the sensed/measured value to place the same in a CCN format suitable for communications over a common communications network (CCN); and 3. Write the sensed/measured value to a CCN buffer of a FIM. |
| PID_Agent Operation (Performed by FIM) | 1. Read control data from a CCN Buffer of a Main/Secondary Controller; 2. Process the control data to place the same in an H1 Link format suitable for communications over an H1 Link; and 3. Write the control data in the H1 Link format to an H1 buffer of a FIM. |
| AO Operation (Performed by FF Device) | 1. Read control data from the H1 Buffer of the Fieldbus Interface Module; 2. Process the control data and perform a particular event specified by the control data. |
| AO.BKOUT Operation (Performed by FF Device) | 1. Generate return data indicating that the particular event has occurred; 2. Process the return data to place the same in an H1 Link format suitable for communications over an H1 Link; and 3. Write the return data to an H1 buffer of an FF device. |
| | |

Table 600

FIG. 6

IF FF DEVICES SIMULATED:

| LINK ACTIVE SCHEDULE 706₃ | |
|---|---|
| Software Operation Identifier | Timing Parameters |
| AI Operation | ▪ |
| AIA_3 Operation | ▪ |
| AI.OUT Operation | ▪ |
| Wait for AI_Agent Operation to be Performed by FIM | ▪ |
| Wait for PID and PID.OUT Operations to be Performed by Main Controller | ▪ 920 |
| Wait for PID_Agent Operation to be Performed by FIM | ▪ 922 |
| AO Operation | ▪ 924 ↰ 926 |
| AO.BKOUT Operation | ▪ |

FIG. 9C

IF FIM AND FF DEVICES SIMULATED:

| LINK ACTIVE SCHEDULE 706₂ | |
|---|---|
| Software Operation Identifier | Timing Parameters |
| AI Operation | ▪ |
| AIA_3 Operation | ▪ |
| AI.OUT Operation | ▪ |
| AI_Agent Operation | ▪ t=0 |
| Wait for PID and PID.OUT Operations to be Performed by Main Controller | ▪ 910 t=m |
| PID_Agent Operation | ▪ 912 t=p |
| AO Operation | ▪ t=q |
| AO.BKOUT Operation | ▪ t=s |

FIG. 9B

SYSTEMS AND METHODS FOR EVENT BASED EXECUTION OF FIELDBUS PROCESS CONTROL STRATEGIES

BACKGROUND

1. Statement of the Technical Field

The invention concerns control systems and methods for interpreting and transforming data structures into sets of events to be used in real and/or simulated Fieldbus devices for executing control strategies.

2. Background

There are many industrial plant control systems (IPCSs) known in the art. One such IPCS is shown in FIG. 1. As shown in FIG. 1, the IPCS 100 is comprised of a control system 102, H1 links $126_1$, $126_2$, and Fieldbus Field (FF) devices 122, 124. The control system 102 typically has a distributed network configuration, i.e., there are application specific modules 104, 106, 108, 114, 116, 120 connected to each other and an operator computer system 112 via a common communications network 110. More specifically, the control system is comprised of a server 104, a database 106, a main controller 108, an operator computer system 112, a supervisory controller 120, and Fieldbus Interface Modules (FIMS) 114, 116. The listed devices 104, ..., 108, 112, ..., 116, 120 are communicatively connected to each other via the common communications network 110 (e.g., an Ethernet Network). As such, the devices 114, 116, 120 include common communications network (CCN) buffers 140, 142, 144. Each of the CCN buffers 140, 142, 144 includes memory used to temporarily store data before it is sent from a first device 114, 116, 120 to a second device 104, 106, 108, 112, ..., 116, 120 over the common communications network 110.

The control system 102 is communicatively connected to the FF devices 122, 124 via the H1 links $126_1$, $126_2$. The phrase "H1 links", as used herein, refers to communications links defining an I/O network (e.g., a Foundation Fieldbus® network). The phrase "Foundation Fieldbus®", as used herein, refers to an all-digital, serial, two-way communications system that serves as a network (e.g., a location area network) for industrial distributed network devices 104, ..., 108, 112, ..., 116, 120 and FF devices 122, 124. The FF devices 122, 124 include, but are not limited to, motors, pumps, gauges, valves, transmitters, actuators, boilers, distiller units, and sensors. Each of the FF devices 122, 124 can include an H1 link buffer 136 as shown in FIG. 1. Each of the H1 link buffers 136 is memory used to temporarily store data before it is sent from a first device to second device over an H1 link $126_1$, $126_2$. Similarly, each of the FIMS 114, 116 includes H1 link buffers 130, 132.

Despite certain advantages of conventional IPCS 100, it suffers from certain drawbacks. For example, the industrial equipment 122, 124 often includes a large number of devices. As such, it is impractical to use the actual IPCS system including all of the above listed devices for purposes of control strategy configuration, operator training, and Factory Acceptance Testing (FAT). For example, the FAT execution is difficult since a portion of the system control resides in the FF devices 122, 124. As such, it is logistically impossible to have thousands of FF devices 122, 124 shipped to a FAT facility and connected to a control network 102 to test a particular IPCS application. Further, if the actual FF devices 122, 124 are used in a FAT, then delays in the construction of the IPCS 100 on site may occur.

In view of the forgoing, there remains a need for a practical system and method that can facilitate control strategy configuration, operator training, and Factory Acceptance Testing (FAT). The system and method needs to be capable of simulating some or all of the network elements and Fieldbus devices of the IPCS 100.

SUMMARY OF THE INVENTION

This Summary is provided to comply with 37 C.F.R. §1.73, providing a summary of the invention briefly indicating the nature and substance of the invention. It is submitted with the understanding that it will not be used to interpret or limit the scope or meaning of the claims.

The present invention concerns systems and methods for event based execution of a Fieldbus process control strategy (FPCS). The event based execution facilitates the simulation of an industrial process partially implemented by a Fieldbus system. The Fieldbus system includes a Fieldbus Interface Module (FIM) and field devices. The methods involve representing an implementation of the FPCS as a Fieldbus data structure (FDS). The FDS comprises a plurality of operational blocks representing operations of the FIM and operations of at least one field device. The methods also involve creating at least one Link Active Schedule (LAS) using the FDS. The LAS schedules software operations for simulating the operations of the FIM and/or field device. The LAS comprises software operation identifiers for software implementations of the operations of the FIM and/or software operation identifiers for software implementations of the operations of the field device. The LAS also comprises timing parameters for performing the software implementations. The methods can further involve running simulation software installed on a computing device for simulating the operations of the FIM and/or field device. The simulation software can be configured for performing functional block executions of the software implementations identified and scheduled in the LAS.

BRIEF DESCRIPTION OF THE DRAWINGS

Embodiments will be described with reference to the following drawing figures, in which like numerals represent like items throughout the figures, and in which:

FIG. 6 is a table listing exemplary operational identifiers and operation descriptions for operations performed by Fieldbus Interface Modules and Fieldbus Field devices.

FIGS. 9A-9C collectively provide schematic illustrations of exemplary Link Active Schedules according to embodiments of the invention.

DETAILED DESCRIPTION

Embodiments of the invention concern systems and methods for facilitating control strategy configuration, operator training, and Factory Acceptance Testing (FAT) of automated equipment control systems. More specifically, the systems implement methods for simulating at least a portion of the network elements and devices of a control system. The systems also implement methods for event based execution of Fieldbus process control strategies.

Embodiments of the invention will now be described more fully hereinafter with reference to accompanying drawings, in which illustrative embodiments of the invention are shown. This invention, may however, be embodied in many different forms and should not be construed as limited to the embodiments set forth herein. For example, the present invention can be embodied as a method, a data processing system, or a computer program product. Accordingly, the present invention can take the form as an entirely hardware embodiment, an entirely software embodiment, or a hardware/software embodiment.

Before describing the systems and methods of the present invention, it will be helpful in understanding an exemplary environment in which the invention can be utilized. In this regard, it should be understood that the methods of the present invention can be utilized in any application where equipment is to be automatively controlled. Such applications include, but are not limited to, industrial plant control applications, medical applications, security applications, and navigation applications. Accordingly, the methods of the present invention will now be described in relation to one such application, namely, the industrial plant control application.

Exemplary Simulation Systems

Figure 2A:
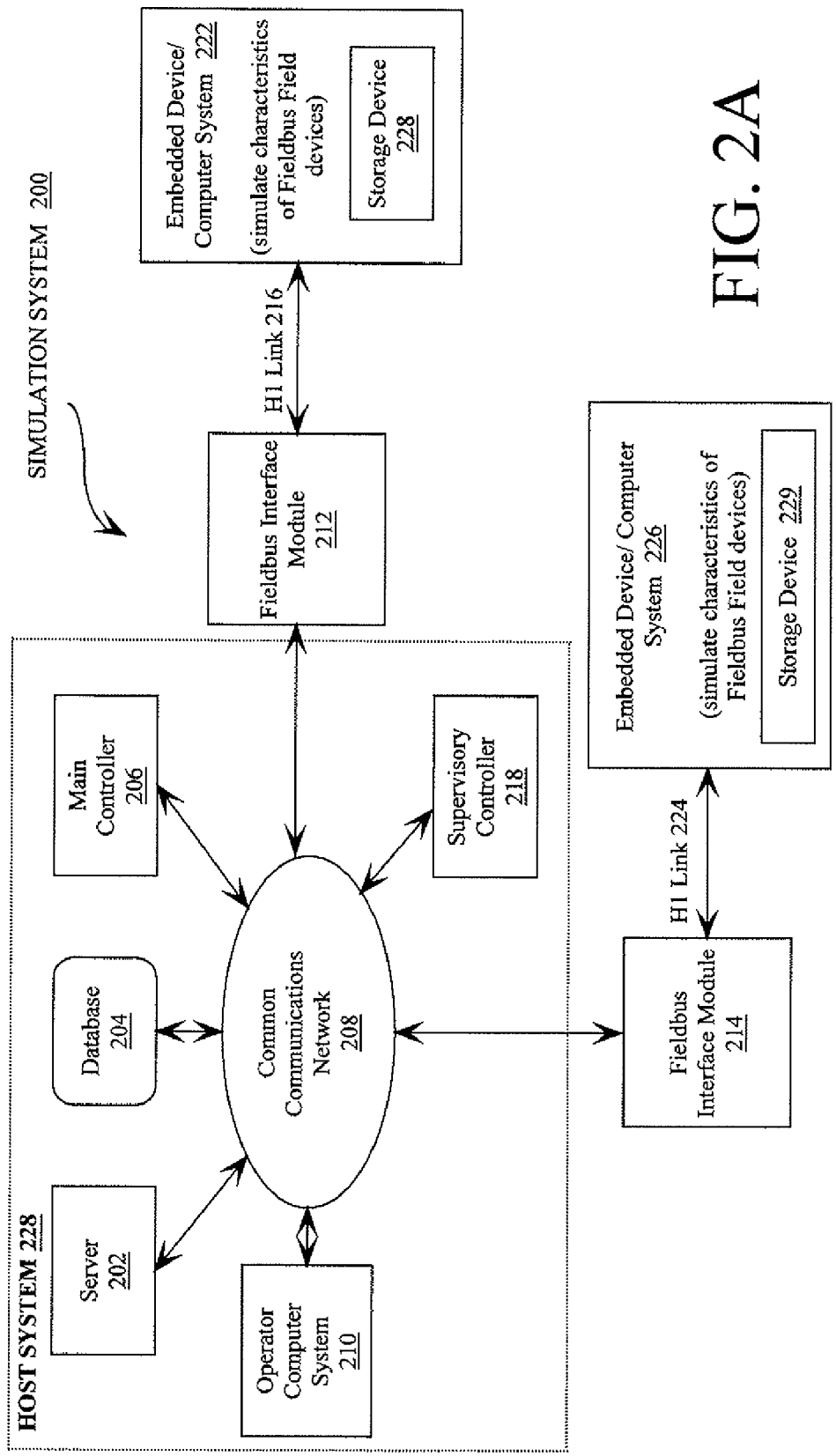
FIG. 2A is a bock diagram of a simulation system according to an embodiment of the invention.

Referring now to FIG. 2A, there is provided a block diagram of an exemplary simulation system 200 according to an embodiment of the invention. The simulation system 200 is configured for simulating the operations and control strategies of an IPCS (e.g., the IPCS 100). In this regard, it should be understood that the simulation system 200 is comprised of a host system 228, Fieldbus Interface Modules (FIMs) 212, 214, and embedded devices/computer systems (ED/CSs) 222, 226. The host system 228 is comprised of a server 202, a database 204, a main controller 206, an operator computer system 210, and a supervisory controller 218. The simulation system 200 is also comprised of a common communications network 208 and H1 links 216, 224. Each of the listed components 202, . . . , 206, 210, 218 is well known to those having ordinary skill in the art, and therefore will not be described in detail herein. However, a brief discussion of the components 202, . . . , 206, 210, 218 is provided to assist a reader in understanding the present invention.

Referring again to FIG. 2A, the listed components 202, . . . , 206, 210, 212, 214, 218 are communicatively coupled to each other via the common communications network 208. As such, each of the listed components 202, . . . , 206, 210, 212, 214, 218 can comprise a common communications network (CCN) buffer. The CCN buffers are not shown in FIG. 2A for simplicity purposes. The CCN buffers can be provided for temporally storing data before it is sent from a first device to a second device. The common communications network 208 can include an Ethernet network. The invention is not limited in this regard. The common communications network 208 can be any type of network selected in accordance with a particular automation process application.

The operator computing system 210 can be configured to facilitate control strategy configuration, operator training, and Factory Acceptance Testing (FAT) of automated equipment. The operator computing system 210 is typically a desktop personal computer system, a laptop personal computer system, a personal digital assistant, a wireless computing device, or any other general purpose computer processing device. Accordingly, the operator computing system 210 includes a user interface (not shown) and a processing device (not shown). The user interface (not shown) often comprises a keyboard (not shown), a mouse (not shown), a display screen (not shown), and the like.

The database 204 can comprise process parameter data used by the main controller 206 and/or supervisory controller 218 to control real or simulated automated equipment (not shown). Such process parameter data can include, but is not limited to, data defining temperature parameters, data defining timing parameters, and data defining liquid level parameters. The database 204 can also comprise simulation data records (not shown) and data defining a simulation computer model (e.g., a simulation computer model shown in FIG. 5). The simulation data records (not shown) and simulation computer model will be described below.

The main controller 206 is comprised of hardware and software configured to control and/or manipulate real/simulated automated equipment. As such, the main controller 206 is communicatively coupled to the ED/CSs 222, 226 via the FIMs 212, 214 and H1 links 216, 224. As stated above, the phrase "H1 links", as used herein, refers to communications links defining an I/O network (e.g., a Foundation Fieldbus® network). The phrase "Foundation Fieldbus®", as used herein, refers to an all-digital, serial, two-way communications system that serves as a network (e.g., a local area network) for industrial distributed network devices 204, . . . , 208, 212, . . . , 216, 220 and FF devices 222, 224.

Figure 1:
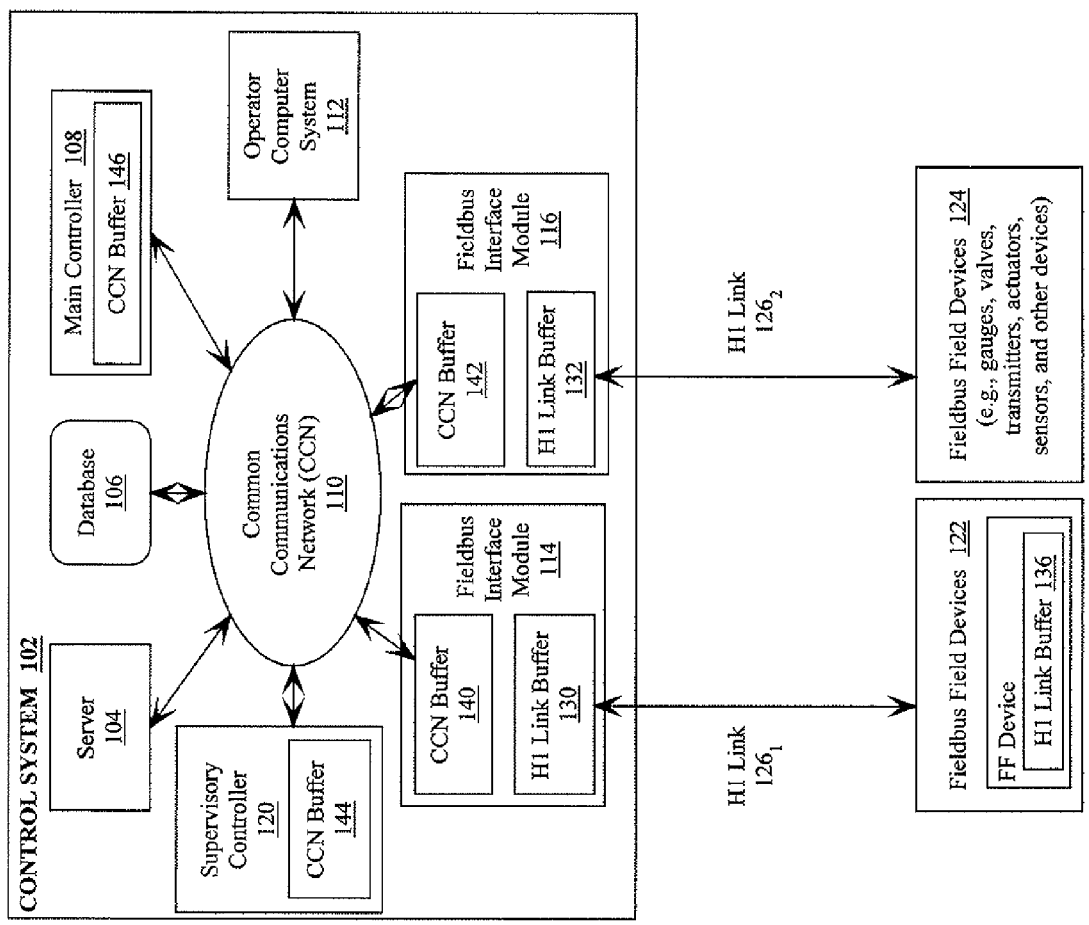
FIG. 1 is a block diagram of a conventional industrial plant control system.

Referring again to FIG. 2A, each of the ED/CSs 222, 226 is comprised of hardware and/or software configured to simulate operations of Fieldbus Field (FF) devices (e.g., FF devices 122, 124 of FIG. 1). In this regard, it should be understood that each of the ED/CSs 222, 226 has a simulation software program installed thereon. The simulation software programs are configured to simulate the operations of the FF devices. The FF devices can include, but are not limited to, motors, pumps, gauges, valves, transmitters, actuators, boilers, distiller units, and sensors. Each of the FF devices can include simulated H1 link buffers (not shown in FIG. 2A) for temporarily storing data before it is sent from an FF device to a FIM 212, 214. Likewise, each of the FIMs 212, 214 can include simulated H1 link buffers (not shown in FIG. 2A) for temporarily storing data before it is sent from a FIM 212, 214 to an FF device. The simulation software program can generate simulation data describing results obtained from simulating the operations of the FF devices. Such simulation data can include, but is not limited to, diagnostic data, calibration data, ranges, configuration information, and default settings.

The simulation software programs use simulation computer models (e.g., the simulation computer model shown in FIG. 5) of the FF device configurations and simulation data records (not shown). Computer models are well known to those having ordinary skill in the art, and therefore will not be described in detail herein. However, it should be understood that the simulation computer model demonstrates a device configuration of an IPCS (such as the IPCS 100 of FIG. 1). More particularly, the simulation computer model illustrates the relationships between the devices of the IPCS (e.g. IPCS 100 of FIG. 1). As such, the simulation computer model comprises functional blocks and interconnections between the functional blocks. Each of the functional blocks represents a particular FF device of an IPCS (e.g., the IPCS 100 shown in FIG. 1). Each of the functional blocks is configured for executing software implementations of FF device operations. An exemplary simulation computer model will be described below in relation to FIG. 5.

The simulation data records (not shown) can comprise data defining the simulation computer model and at least one control strategy employed by components of an IPCS (e.g., the IPCS 100 shown in FIG. 1). The control strategy can be, but is not limited to, a control strategy of the simulation system 200. The phrase "control strategy", as used herein, refers to a combination of events designed to facilitate the performance of an industrial process in accordance with a particular facility and/or government agency plan. An exemplary control strategy will be described below in relation to FIG. 6.

The simulation data records (not shown) can also comprise data defining operating characteristics of the FF devices (e.g., FF devices 122, 124 of FIG. 1), FF device parameters, and communication links between the FF devices and FIMs (e.g., FIMs 114, 116 of FIG. 1 and FIMS 212, 214 of FIG. 2A). Such data can be obtained from the manufactures of the FF devices (e.g., FF devices 122, 124 of FIG. 1). Such data is typically contained in one or more device description files (or DD files). DD files are well known to those having ordinary skill in the art, and therefore will not be described herein. The simulation data records can be stored in the database 204. The simulation data records can be loaded to a storage device 227, 229 of the ED/CS 222, 226 subsequent to launching the simulation software program installed on the respective device 222, 226.

Referring again to FIG. 2A, the FIMs 212, 214 provide connections between the ED/CSs 222, 226 and the host system 228. The FIMs 212, 214 also provide access to diagnostic information generated by the simulation software program installed on the ED/CSs 222, 226. The FIMs 212, 214 can generally be configured for delivering systemwide integration of data access, control, connections, diagnostics, and alarms. In this regard, it should be understood that the FIMs 212, 214 can calibrate, monitor, and/or control the operations of real and simulated FF devices. The FIMs 212, 214 can also provide alerts to flag maintenance notifications, environmental emissions, activation of safety showers, low tank levels, high tank levels, sensor drifts, and the like.

According to an embodiment of the invention, the main controller 206 can be a C300 Process Controller or C200 Process Controller provided by Honeywell International of Morristown, N.J. The FIM 212 can be a Chassis Series-A Fieldbus Interface Module or a Series C Fieldbus Interface Module provided by Honeywell International of Morristown, N.J. Similarly, the FIM 214 can be a Chassis Series-A Fieldbus Interface Module or a Series C Fieldbus Interface Module provided by Honeywell International of Morristown, N.J. The Chassis Series A FIM supports up to two (2) H1 links per module. In contrast, the Series C FIM supports up to four (4) H1 links per module. The invention is not limited in this regard.

Figure 2B:
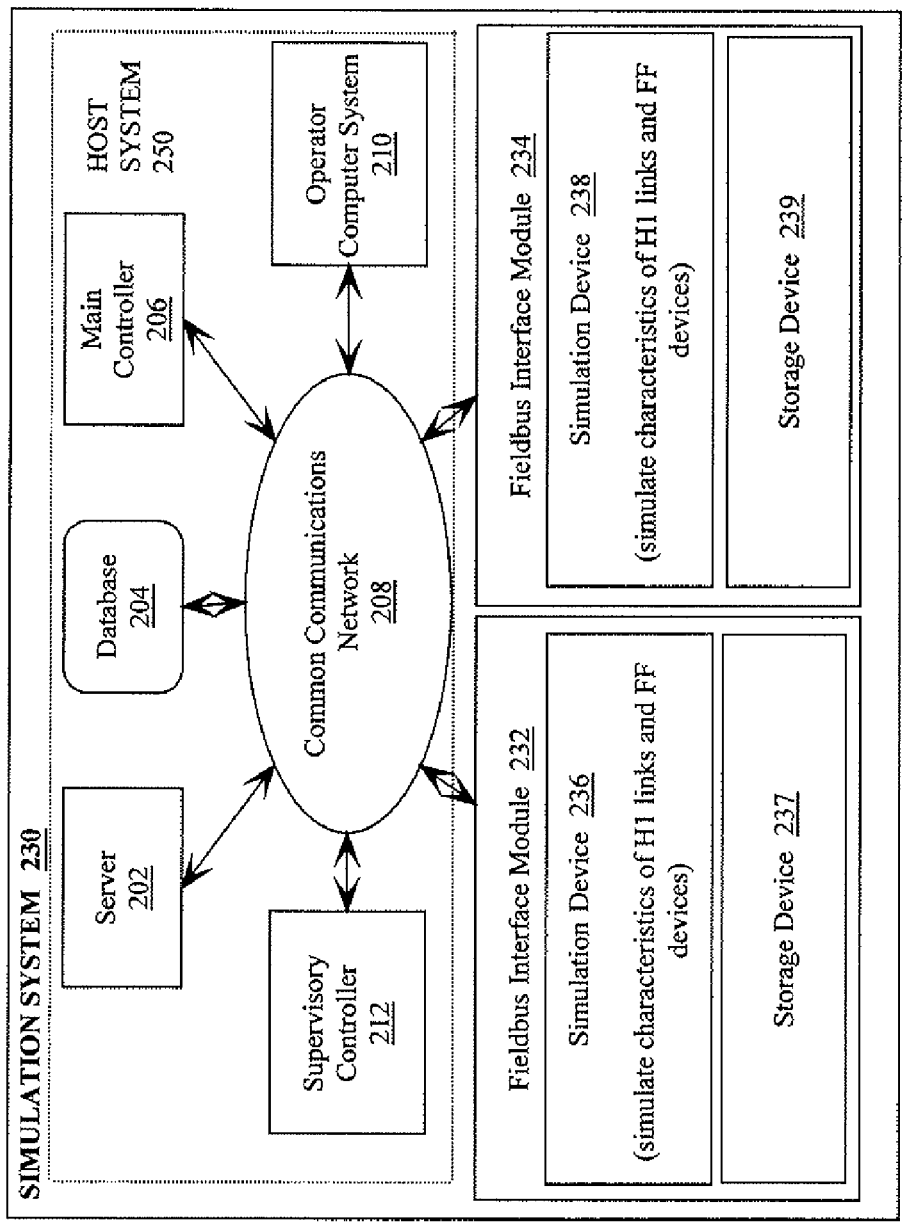
FIG. 2B is a bock diagram of a simulation system according to an embodiment of the invention.

Referring now to FIG. 2B, there is provided another example of a simulation system 230 according to an embodiment of the invention. As shown in FIG. 2B, the simulation system 230 is comprised of a host system 250 and at least one FIM 232, 234. The host system 250 is comprised of a server 202, a database 204, a main controller 206, an operator computer system 210, and a supervisory controller 212. Each of these listed components 202, . . . , 206, 210, 212, 232, 234 is communicatively coupled via a common communications network 208. The common communications network 208 can be an Ethernet Network. Each of these components 202, . . . , 206, 210, 212 is also described above in relation to FIG. 2A. The description provided above is sufficient for understanding the components 202, . . . , 206, 210, 212 of the simulation system 230.

Referring again to FIG. 2B, the FIMS 232, 234 are generally configured for delivering systemwide integration of data access, control, connections, diagnostics, and alarms. In this regard, it should be understood that the FIMs 232, 234 provide access to diagnostic information generated by the simulation software program installed thereon. The FIMs 232, 234 can calibrate, monitor, and/or control the operations of real/simulated FF devices. The FIMs 232, 234 can also provide alerts to flag maintenance notifications, environmental emissions, activation of safety showers, low tank levels, high tank levels, sensor drifts, and the like.

According to an embodiment of the invention, the main controller 206 is a C200 Process Controller or C300 Process Controller provided by Honeywell International of Morristown, N.J. The FIM 232 can be a Chassis Series-A Fieldbus Interface Module or a Series C Fieldbus Interface Module provided by Honeywell International of Morristown, N.J. Similarly, the FIM 234 can be a Chassis Series-A Fieldbus Interface Module or a Series C Fieldbus Interface Module provided by Honeywell International of Morristown, N.J. The Chassis Series A FIM supports up to two (2) H1 links per module. In contrast, the Series C FIM supports up to four (4) H1 links per module. Each of the FIMs is comprised of hardware/software configured to simulate operations and/or control strategies of an IPCS (e.g., IPCS 100 of FIG. 1). The invention is not limited in this regard.

Referring again to FIG. 2B, each of the FIMs 232, 234 is comprised of a simulation device 236, 238, respectively. The simulation devices 236, 238 include hardware and/or software configured to simulate certain operations of an IPCS (such as the IPCS 100 shown in FIG. 1). In this regard, it should be understood that each of the simulation devices 236, 238 has a simulation software program installed thereon. The simulation software programs are configured to simulate the characteristics of H1 links (e.g., H1 links $126_1$, $126_2$ of FIG. 1), FF devices (e.g., FF devices 122, 124 of FIG. 1), and at least one characteristic of a FIMS 232, 234. As noted above, the H1 links are communications links defining an I/O network (e.g., a FOUNDATION FIELDBUS® network). The FF devices can include, but are not limited to, motors, pumps, gauges, valves, transmitters, actuators, boilers, distiller units, and sensors. The simulation software program can generate simulation data describing results obtained from simulating the operations of the FF devices. Such simulation data can include, but is not limited to, diagnostic data, calibration data, ranges, configuration information, and default settings.

The simulation software programs use simulation computer models and simulation data records (not shown). The simulation computer models will be described below in relation to FIG. 5. However, it should be understood that the simulation computer models demonstrate device configurations of an IPCS (e.g., the IPCS 100 of FIG. 1). More particularly, the simulation computer models illustrate the relationships between particular devices of the IPCS (e.g. IPCS 100 of FIG. 1). As such, the simulation computer models comprise functional blocks and interconnections between the functional blocks. Each of the functional blocks represents an FF device of an IPCS (e.g., the IPCS 100 shown in FIG. 1). The interconnections represent the H1 links (e.g., H1 links $126_1, \ldots, 126_8$ of FIG. 1) between FF devices (e.g., FF devices 122, 124 of FIG. 1) and at least one FIM (e.g., FIMs 114, 116 of FIG. 1 and FIMs 232, 234 of FIG. 2B).

The simulation data records (not shown) can be stored in the database 204. The simulation data records can be loaded to a storage device 237, 239 of the FIM 232, 234 subsequent to launching the simulation software program installed on the FIM 232, 234. The simulation data records (not shown) can comprise data defining the simulation computer model and at least one control strategy employed by components of an IPCS (e.g., the IPCS 100 shown in FIG. 1). An exemplary control strategy will be described below in relation to FIG. 6. The simulation data records (not shown) can also comprise data defining operating characteristics of the FF devices (e.g., FF devices 122, 124 of FIG. 1). Such data can generally be obtained from the manufactures of the FF devices. Such data is typically contained in one or more device description files (or DD files). DD files are well known to those having ordinary skill in the art, and therefore will not be described herein. The simulation data records can further comprise data defining the characteristics of H1 links (e.g., H1 links $126_1, \ldots, 126_8$ of FIG. 1) between FF devices (e.g., FF devices 122, 124 of FIG. 1) and FIMs (e.g., FIMs 114, 116 of FIG. 1 and FIMs 232, 234 of FIG. 2B).

Figure 2C:
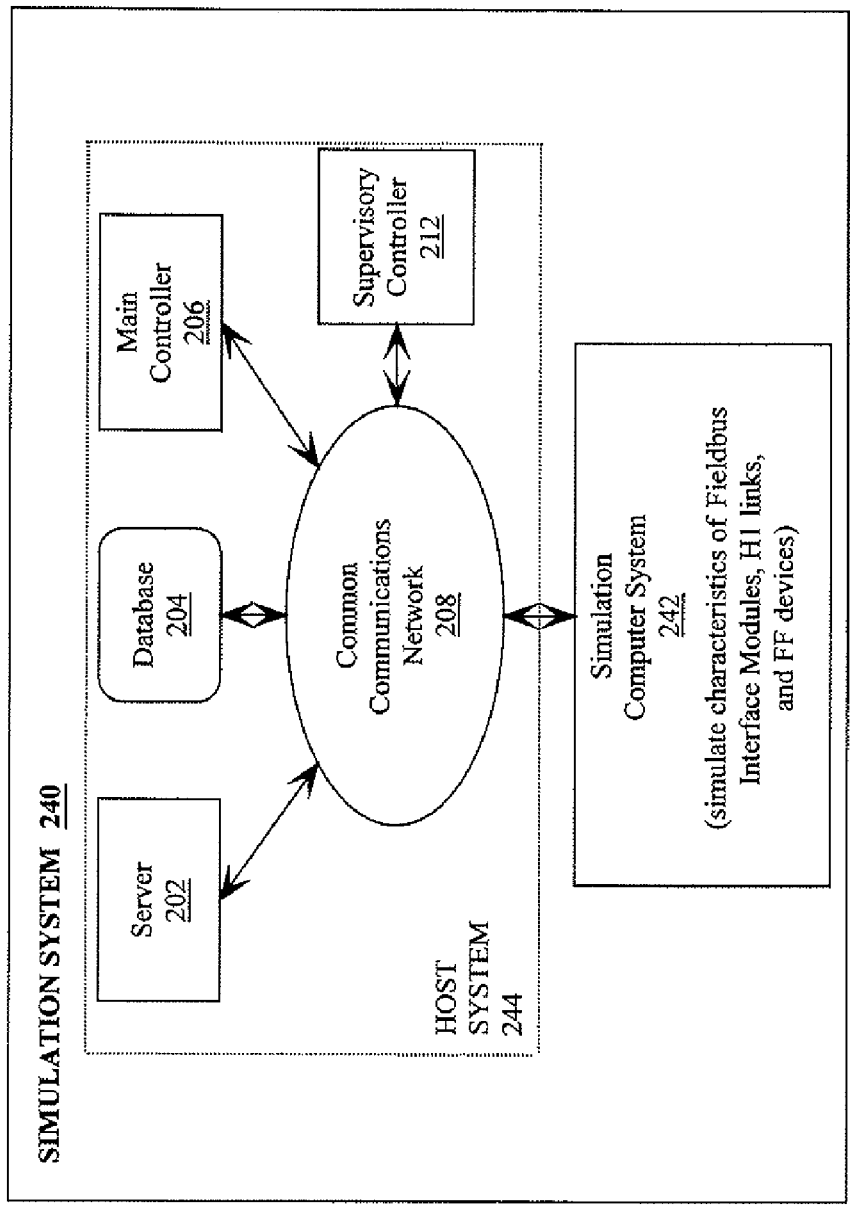
FIG. 2C is a bock diagram of a simulation system according to another embodiment of the invention.

Referring now to FIG. 2C, there is provided yet another example of a simulation system 240 according to an embodiment of the invention. As shown in FIG. 2C, simulation system 240 is comprised of a host system 244 and a simulation computer system 242. The host system 244 comprises a server 202, a database 204, a main controller 206, and a supervisory controller 212. Each of the listed components 202, ..., 206, 212, 242 are communicatively coupled via a common communications network 208. The common communications network can be an Ethernet Network. Each of these components 202, ..., 206, 212, is described above in relation to FIG. 2A. The description provided above is sufficient for understanding the components 202, ..., 206, 212, of the simulation system 240.

The simulation computer system 242 is configured to facilitate control strategy configuration, operator training, and Factory Acceptance Testing (FAT) of automated equipment. The simulation computer system 242 is typically a desktop personal computer system, a laptop personal computer system, a personal digital assistant, a wireless computing device, or any other general purpose computer processing device.

Figure 3:
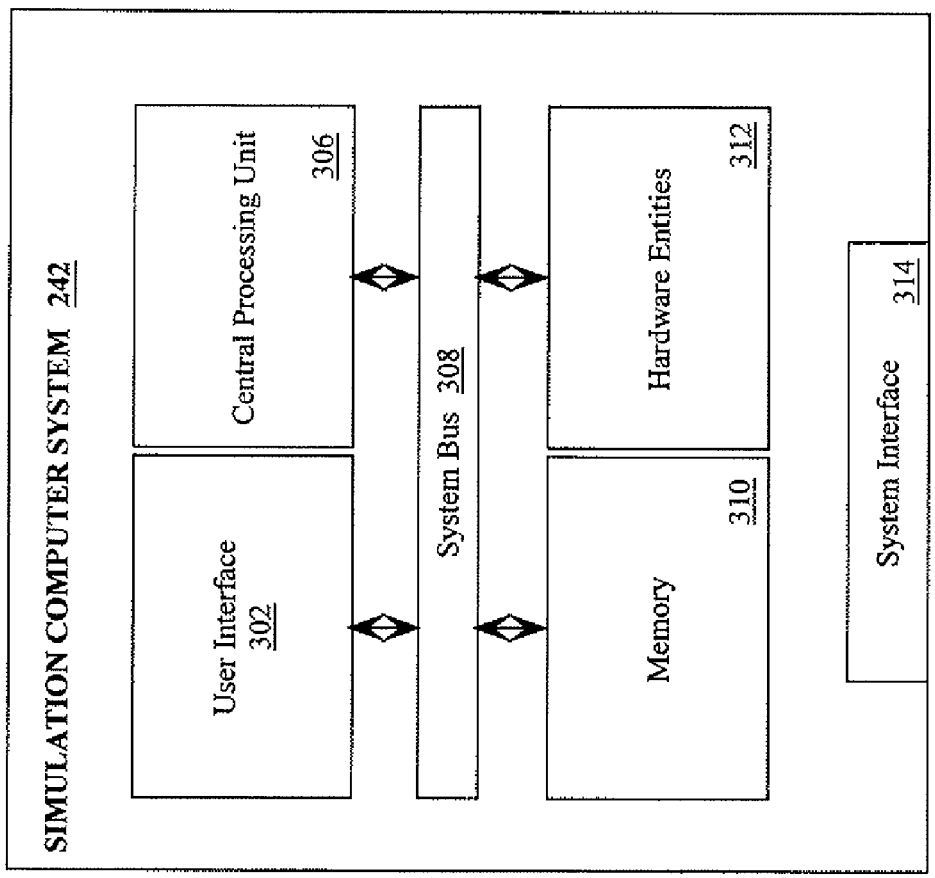
FIG. 3 is a more detailed block diagram of a simulation computer system according to yet another embodiment of the invention.

A more detailed block diagram of the simulation computer system 242 is provided in FIG. 3. As shown in FIG. 3, the simulation computer system 242 is comprised of a system interface 314, a user interface 302, a central processing unit 306, a system bus 308, a memory 310 connected to and accessible by other portions of the simulation computer system 242 through the system bus 308, and hardware entities 312 connected to the system bus 308. At least some of the hardware entities 312 perform actions involving access to and use of the memory 310, which may be a random access memory (RAM), a disk driver, and/or a compact disc read only memory (CD-ROM).

The hardware entities 312 may include microprocessors, application specific integrated circuits (ASICs), and other hardware. The hardware entities 312 may include a microprocessor programmed for simulating at least one operation of an IPCS (such as the IPCS 100 shown in FIG. 1). In this regard, it should be understood that the microprocessor can access and run a simulation software program installed on the simulation computer system 242. Alternatively, the microprocessor can have the simulation software program installed thereon.

The simulation software program can be configured to simulate the characteristics of at least one FIM (e.g., FIMs 114, 116 of FIG. 1), at least one H1 link (e.g., H1 Links $126_1, \ldots, 126_8$ of FIG. 1), and/or at least one FF device (e.g., FF devices 122, 124 of FIG. 1). The simulation software program can use simulation computer models and simulation data records (not shown). Simulation computer models will be described below in relation to FIG. 5. However, it should be understood that the simulation computer models demonstrate device configurations of an IPCS (e.g., the IPCS 100 of FIG. 1). More particularly, the simulation computer models illustrate the relationships between the devices of the IPCS (e.g. IPCS 100 of FIG. 1). As such, the computer models comprise functional blocks and interconnections between the functional blocks. Each of the functional blocks represents a FIM (e.g., FIMs 114, 116 of FIG. 1) or an FF device (e.g., FF devices 122, 124 of FIG. 1). The interconnections define the H1 links (e.g., H1 Links $126_1, \ldots, 126_8$ of FIG. 1) between the FIMs and FF devices. The microprocessor can generate simulation data describing results obtained from simulating the operations of FIMs and FF devices. Such simulation data can include, but is not limited to, diagnostic data, calibration data, ranges, configuration information, and default settings.

The simulation data records (not shown) can be stored in the database 204 (shown in FIG. 2C). The simulation data records can be loaded to memory 310 subsequent to launching the simulation software program installed on the simulation computer system 242. As such, the microprocessor can access the database 204 and retrieve simulation data records (not shown) therefrom. Similarly, the microprocessor can access memory 310 and retrieve simulation data records (not shown) therefrom.

The simulation data records (not shown) can comprise data defining the simulation computer model and at least one control strategy employed by components of an IPCS (e.g., the IPCS shown in FIG. 1). An exemplary control strategy will be described below in relation to FIG. 6. The simulation data records (not shown) can also comprise data defining operating characteristics and device parameters of FIMs (e.g., FIMs 114, 116 of FIG. 1) and/or FF devices (e.g., FF devices 122, 124). Such data can be obtained from the manufactures of the FIMs and/or FF devices. Such data is typically contained in one or more device description files (or DD files). DD files are well known to those having ordinary skill in the art, and therefore will not be described herein. The simulation data records can further comprise data defining the characteristics of (a) H1 links (e.g., H1 Links $126_1, \ldots, 126_8$ of FIG. 1) between FF devices (e.g., FF devices 122, 124 of FIG. 1) and FIMs (e.g., FIMS 112, 116 of FIG. 1), and (b) communications links between the FIMs and components 202, 204, 206, 212 of a host system 244 (shown in FIG. 2C).

The user interface 302 is comprised of input devices, output devices, and software routines configured to allow a user to interact with and control software applications installed on the simulation computer system 242. Such input and output devices include, but are not limited to, a display screen (not shown), a speaker (not shown), a keypad (not shown), a directional pad (not shown), a directional knob (not shown), and a microphone (not shown). As such, the user interface 302 can facilitate a user-software interaction for simulating at least one operation of an IPCS (such as the IPCS shown in FIG. 1). The user interface 302 can facilitate a user-software interaction for viewing simulation data generated as a result of running a simulation software program.

The system interface 314 allows the simulation computer system 242 to communicate directly or indirectly with a sever 202 (described above in relation to FIG. 2A), a database 204 (described above in relation to FIG. 2A), a main controller 206 (described above in relation to FIG. 2A), and/or a supervisory controller 212 (described above in relation to FIG. 2A). If the simulation computer system 242 is communicating indirectly with the devices 202, 204, 206, 212, then the simulation computer system 242 is sending and receiving communications through the common communications network 208. The common communications network 208 can be an Ethernet network.

Exemplary Method for Simulating an Operation of a Fieldbus System

Figure 4A:
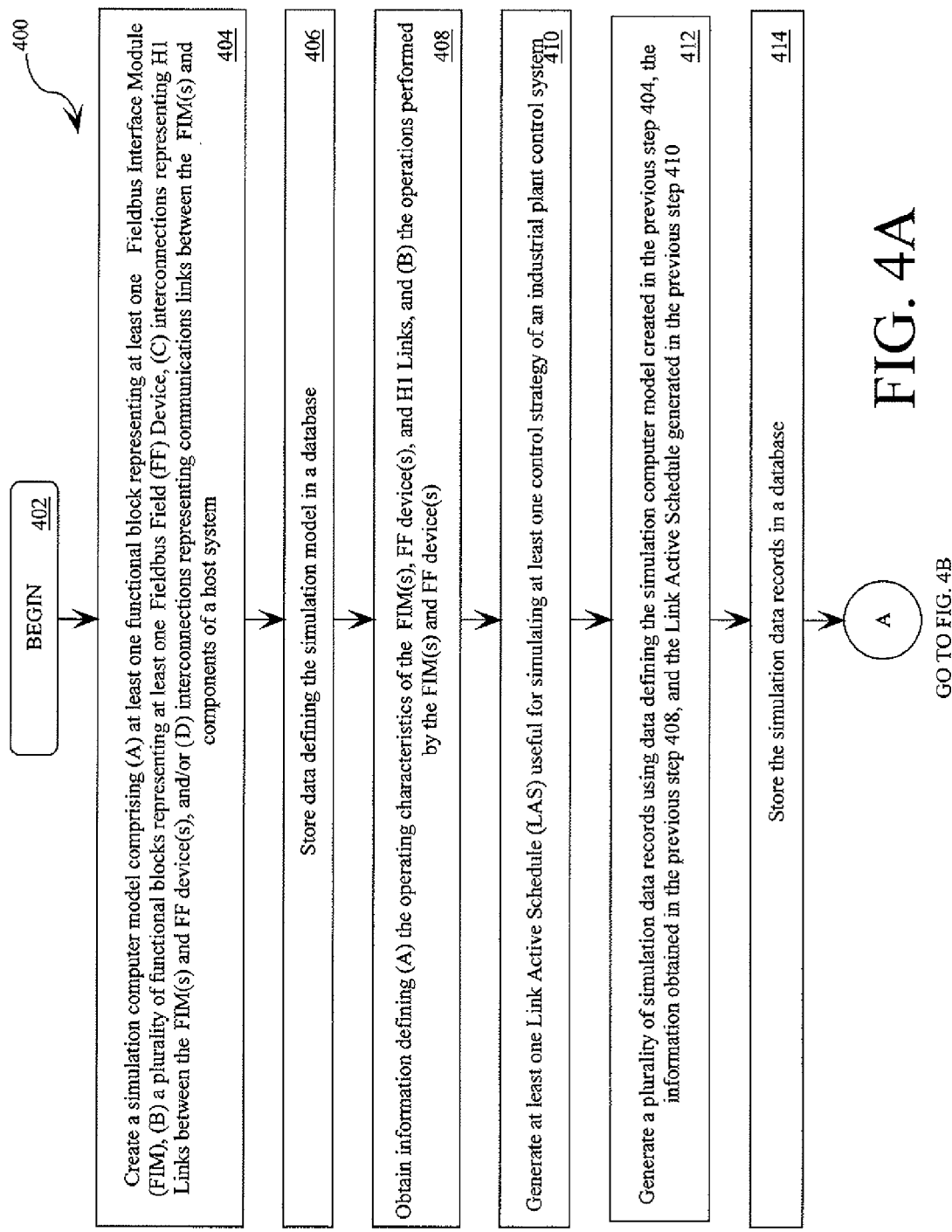
FIGS. 4A-4B collectively provide a flow diagram of a method for simulating operations of a control system according to an embodiment of the invention.
Figure 4B:
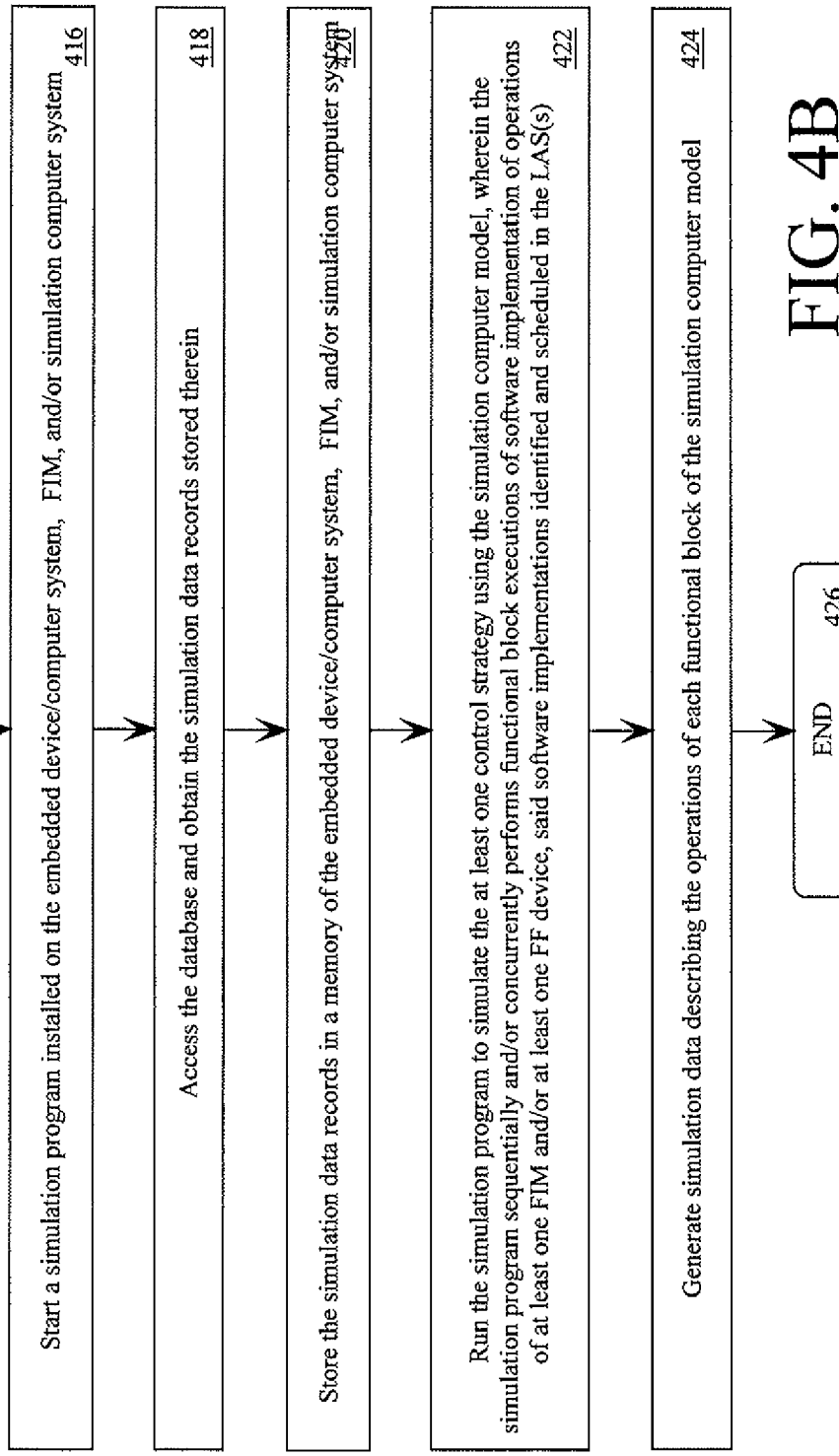

The following FIGS. 4A-4B and accompanying text illustrate a method 400 according to an embodiment of the invention for simulating an operation of a Fieldbus system comprising at least one Fieldbus Interface Module (FIM) communicatively coupled to a plurality of Fieldbus Field (FF) devices. It should be appreciated, however, that the method 400 disclosed herein is provided for purposes of illustration only and that the present invention is not limited solely to the method shown.

Referring now to FIG. 4A, the method 400 begins at step 402 and continues with step 404. In step 404, a simulation computer model is created. The simulation computer model can comprise functional blocks representing at least one FIM and/or at least one FF device. The simulation computer model can also comprise interconnections defining H1 links between FIM(s) and FF devices, and/or interconnections defining communications links between FIM(s) and components of a host system (e.g., host systems 228, 250, and 244 of FIGS. 2A-2C). A schematic illustration of an exemplary simulation computer model 500 is provided in FIG. 5.

Figure 5:
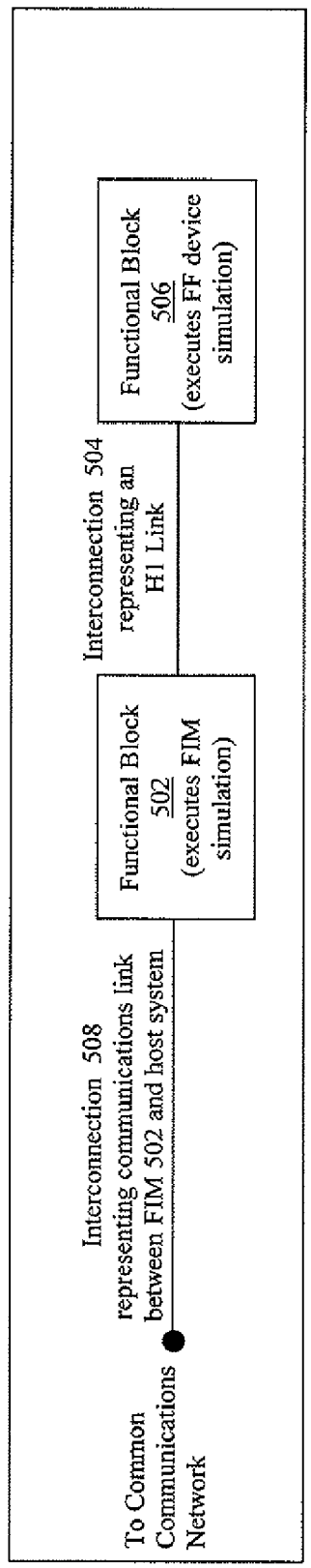
FIG. 5 is a block diagram of an exemplary simulation computer model according to an embodiment of the invention.

As shown in FIG. 5, the simulation computer model 500 can comprise a functional block 502 configured for executing a FIM simulation, a functional block 506 configured for executing an FF device simulation, an interconnection 508 representing a communications link between a FIM and a host system, and an interconnection 502 representing an H1 link between an FF device and a FIM. The invention is not limited in this regard. The simulation computer model can include any number of functional blocks and interconnections selected in accordance with a particular simulation application.

Referring again to FIG. 4A, the method 400 continues with step 406. In step 406, data defining the simulation computer model is stored in a database (e.g., database 204 of FIGS. 2A-2C). In step 408, information is obtained that defines the operating characteristics of the at least one FIM, at least one FF device, and at least one H1 link Step 408 also involves obtaining information defining operations performed by the least one FIM and at least one FF device. A table 600 illustrating exemplary operations defining information (ODI) is provided in FIG. 6.

As shown in FIG. 6, the ODI includes operation identifiers 602 and operation descriptions 604. The operation identifiers 602 can include identifiers for operations performed by at least one FF device and identifiers for operations performed by at least one FIM. The invention is not limited in this regard. The ODI can include information for operations performed by any device of an IPCS (e.g., IPCS 100 of FIG. 1) selected in accordance with a particular simulation system 200, 230, 240 application.

The operation descriptions 604 can describe the operations of an FF device or a FIM associated with the operation identifiers 602. For example, an AI Operation involves generating an analog input signal representing a sensed/measured value and communicating the analog input signal from a sensor/gauge of an FF device to a processor of the FF device. An AIA_3 Operation involves processing an analog input signal to place a sensed/measured value in an H1 link format suitable for communications from an FF device to a FIM over an H1 link. An AI.Out Operation involves writing sensed/measured value in an H1 link format to a simulated H1 link buffer of an FF device. An AI_Agent Operation involves reading a sensed/measured value from a simulated H1 buffer of an FF device, processing the sensed/measured value to place the same in a CCN format suitable for communications over a common communications network, and writing the sensed/measured value in the CCN format to a CCN buffer of a FIM. A PID_Agent Operation involves reading control data from a CCN Buffer of a main controller, processing the control data to place the same in an H1 link format suitable for communications over an H1 link, and writing the control data in the H1 link format to a simulated H1 buffer of a FIM. An AO Operation involves reading control data from a simulated H1 buffer of a FIM, processing the control data, and performing a particular event specified by the control data. An AO.BK-OUT Operation involves generating return data indicating that the particular event has occurred, processing the return data to place the same in an H1 link format suitable for communications over an H1 link, and writing the return data to a simulated H1 link Buffer of an FF device. The invention is not limited in this regard. The operation descriptions 604 can describe the operations of any device of an IPCS (e.g., the IPCS 100 of FIG. 1) selected in accordance with a particular simulation system 200, 230, 240 application.

Referring again to FIG. 4A, the method 400 continues with step 410. In step 410, a Link Active Schedule is generated. The Link Active Schedule is used by simulation software for simulating at least one control strategy of an IPCS (such as the IPCS 100 of FIG. 1). After being generated, the Link Active Schedule can be stored in a database (e.g., database 206 described above in relation to FIGS. 2A-2C). A schematic illustration of an exemplary process 700 for generating a Link Active Schedule 706 is provided in FIG. 7.

Figure 7:
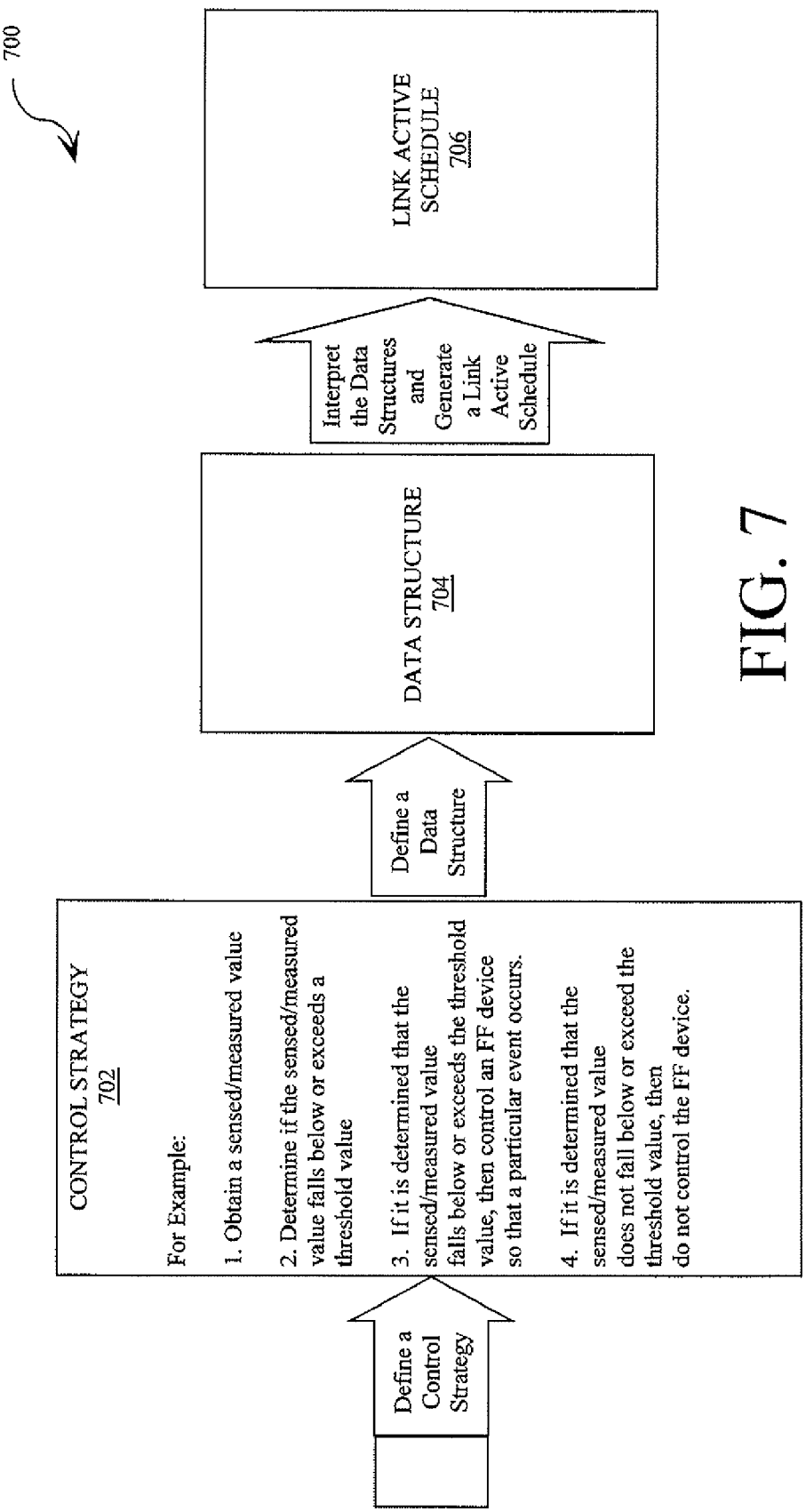
FIG. 7 is a schematic illustration of a process for creating a Link Active Schedule according to an embodiment of the invention.

As shown in FIG. 7, the process 700 begins with defining a control strategy 702. As noted above, a control strategy 702 is defined by a combination of events designed to facilitate the performance of an industrial process in accordance with a particular facility and/or government agency plan. More particularly, the control strategy 702 can be defined by events for controlling FF devices and for interchanging data between controllers, FIMs, and/or FF devices. For example, a control strategy 702 can be defined by a combination of events selected for: (1) obtaining a sensed/measured value from an FF device; (2) determining if the sensed/measured value falls below or exceeds a threshold value; and (3) controlling an FF device so that a particular event occurs if it is determined that the sensed/measured value falls below or exceeds a threshold value. The invention is not limited in this regard. The control strategy can be selected in accordance with a particular IPCS application.

Figure 8:
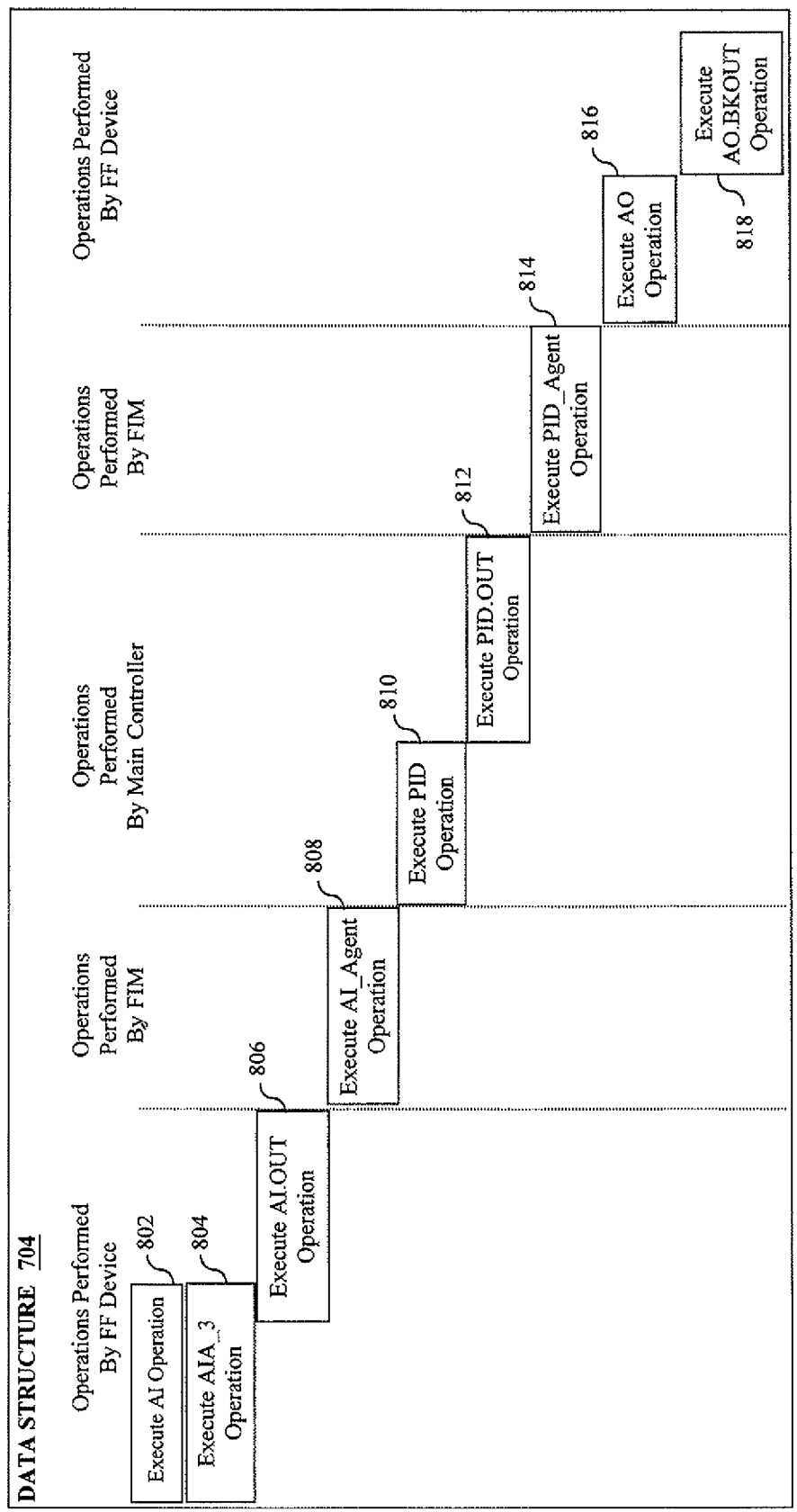
FIG. 8 is a schematic illustration of an exemplary data structure according to an embodiment of the invention.

Thereafter, the process 700 continues with defining a data structure 704. The data structure 704 is a representation of an implementation of a control strategy 702. A schematic illustration of an exemplary data structure 704 is provided in FIG. 8. As shown in FIG. 8, the exemplary data structure 704 comprises a plurality of operational blocks 802, . . . , 818 representing operations of Fieldbus system devices (e.g., a main controller, a FIM, and a field device). The operational blocks 802, ..., 818 are organized in an order of performance.

For example, a control strategy 702 begins with the concurrent executions of an AI Operation (represented by operational block 802) and an AIA_3 Operation (represented by operational block 804) by an FF device. Prior to completing the AIA_3 Operation, the FF device begins performing an AI.OUT Operation (represented by operational block 806). After the FF device completes the AI.OUT Operation, a FIM performs an AI_Agent Operation (represented by operational block 808). Subsequent to completing the AI_Agent Operation, a main controller sequentially performs certain MC operations, such as an MC Operation (represented by operational block 810) and an MC.OUT Operation (represented by operational block 812). The MC Operations can involve reading a sensed/measured value from a CCN Buffer of a FIM, determining if the sensed/measured value falls below or exceeds a threshold value, and generating control data if it is determined that the sensed/measured value falls below or exceeds the threshold value. The MC.OUT Operation can involve writing the control data to a CCN Buffer of the main controller. Upon completing the MC and MC.OUT Operations, the FIM performs a PID_Agent Operation (represented by operational block 814). Thereafter, the FF device performs an AO Operation (represented by operational block 816) and an AO.BKOUT Operation (represented by operational block 818). The invention is not limited in this regard. The data structure 704 can be designed in accordance with any given control strategy.

Figure 9A:
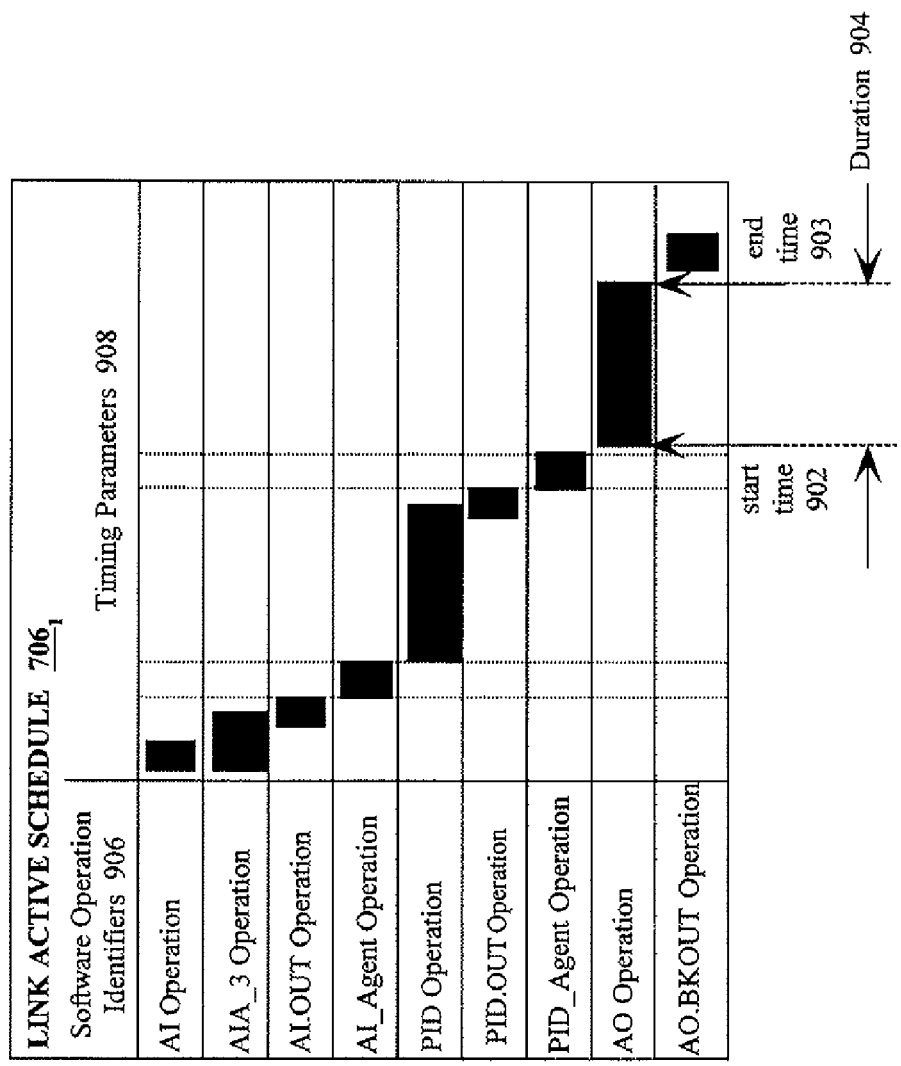

Referring again to FIG. 7, the process 700 continues with interpreting the data structure and generating a Link Active Schedule 706. Exemplary Link Active Schedules $706_1, \ldots, 706_3$ are provided in FIGS. 9A, 9B, and 9C. Referring now to FIG. 9A, the Link Active Schedule $706_1$ provides a way of storing data in a memory so that it can be used efficiently. The Link Active Schedule $706_1$ facilitates the simulation of a variety of operations performed by real FF devices and/or FIMs. The Link Active Schedule $706_1$ defines operations of a data structure 704 in terms of time and order of performance. The Link Active Schedule $706_1$ can be implemented using (a) software operation identifiers 906 for software implementations of device operations and (b) timing parameters 908 for performing the software implementations. Each of the timing parameters can include a start time 902 for performing a software implementation and/or a duration 904 for performing the software implementation. As should be understood, the duration 904 is bounded by the start time 902 and an end time 903.

Referring now to FIG. 9B, if at least one FF device and at least one FIM is to be simulated using simulation software, then the Link Active Schedule $706_2$ can include a scheduled waiting operation 910. The waiting operation 910 is provided so that a subsequent scheduled operation 912 is not prematurely performed, i.e., so that the subsequent scheduled operation 912 is not performed while a real main controller (or other real device) performs its scheduled operation(s). The invention is not limited in this regard. For example, the Link Active Schedule $706_2$ can be absent of the waiting operation 910.

Referring now to FIG. 9C, if at least one FF device is to be simulated using simulation software, then the Link Active Schedule $706_3$ can include a plurality of scheduled waiting operations 920, 922, 924. The scheduled waiting operations 920, 922, 924 are provided so that a subsequent scheduled operation 912 is not pre-maturely performed, i.e., so that the subsequent scheduled operation 926 is not performed while a real main controller (or other real device) and a FIM perform their scheduled operation(s). The invention is not limited in this regard. For example, the Link Active Schedule $706_3$ can be absent of the waiting operations 920, 922, 924.

Referring again to FIG. 4A, the method 400 continues with step 412. In step 412, a plurality of simulation data records are generated using the data defining the simulation computer model (created in the previous step 404), the information obtained in the previous step 408, and the Link Active Schedule generated in the previous step 410. Thereafter, step 414 is performed where the simulation data records are stored in a database (e.g., database 204 of FIGS. 2A-2C). Subsequent to completing step 414, the method 400 continues with step 416 of FIG. 4B.

Referring now to FIG. 4B, step 416 involves starting a simulation program installed on an ED/CSs (e.g., ED/CSs 222, 226 of FIG. 2A), a FIM (e.g, FIMs 232, 234 of FIG. 2B), and/or a simulation computer system (e.g., simulation computer system 242 of FIG. 2C). After the simulation program is started, steps 418 and 420 are performed. In steps 418 and 420, the simulation data records are loaded into a memory of the device (e.g., ED/CSs 222, 226 of FIG. 2A, FIMs 232, 234 of FIG. 2B, and simulation computer system 242 of FIG. 2C). In this regard, it should be understood that step 418 involves accessing the database and obtaining the simulation data records stored therein. Step 420 involves storing the simulation data records in a memory of the device (e.g., ED/CSs 222, 226 of FIG. 2A, FIMs 232, 234 of FIG. 2B, and simulation computer system 242 of FIG. 2C).

Subsequent to completing step 420, step 422 is performed where the simulation program is run to simulate the control strategy(ies) using the simulation computer model. The simulation program is configured to sequentially and/or concurrently perform functional block executions of software implementations of operations for at least one FIM and/or at least one FF device. As noted above, the software implementations are identified and scheduled in the Link Active Schedule(s). An exemplary functional block execution process performed by the simulation program will be described below in relation to FIGS. 10-11 and EXAMPLE 1. After step 422, step 424 is performed where simulation data is generated. The simulation data describes the operations of each functional block of the simulation computer model. Thereafter, step 426 is performed where the method 400 ends.

Figure 10:
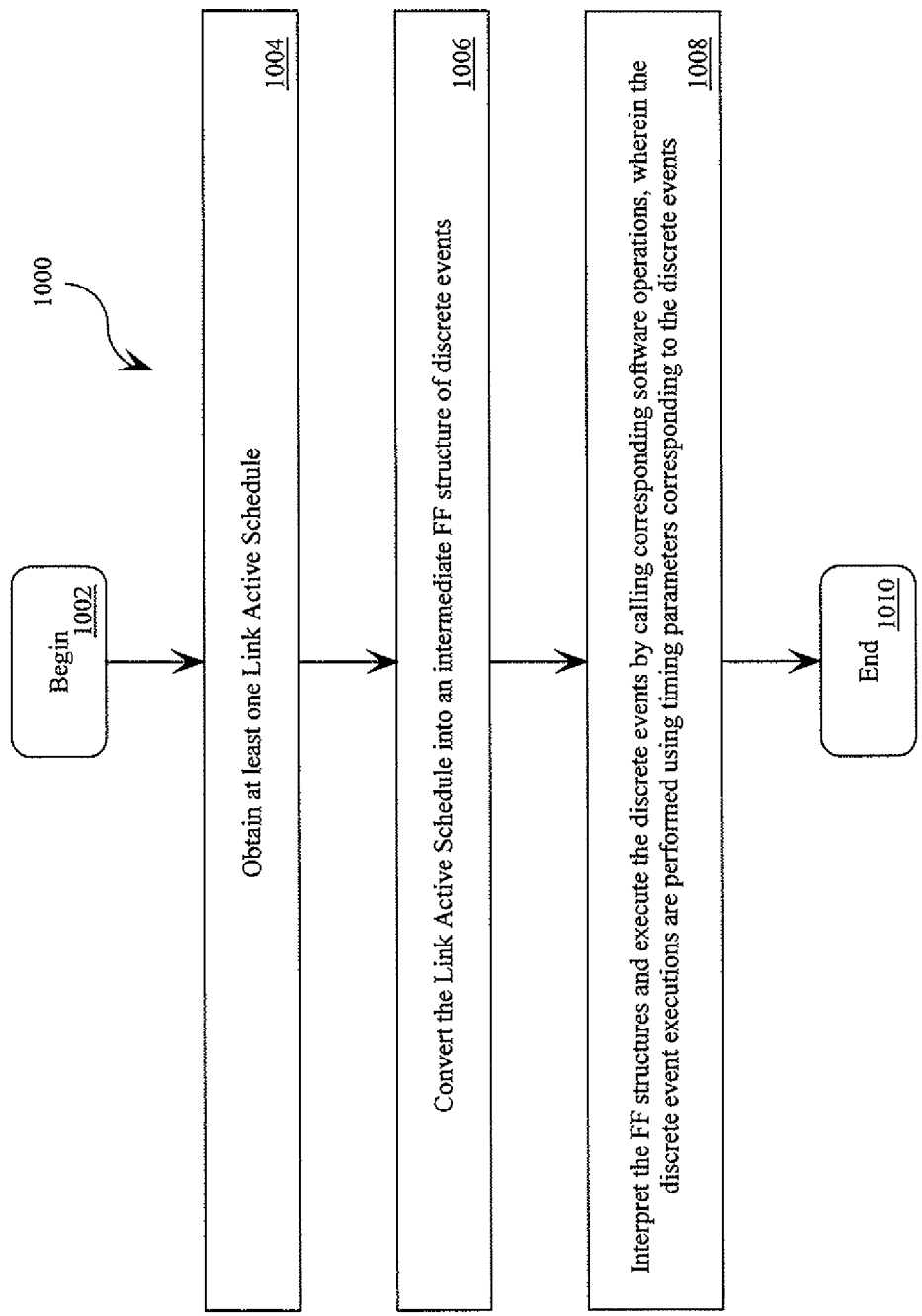
FIG. 10 is a flow diagram of an exemplary functional block execution process 1000 performed by the simulation program according to embodiments of the invention.
Figure 11:
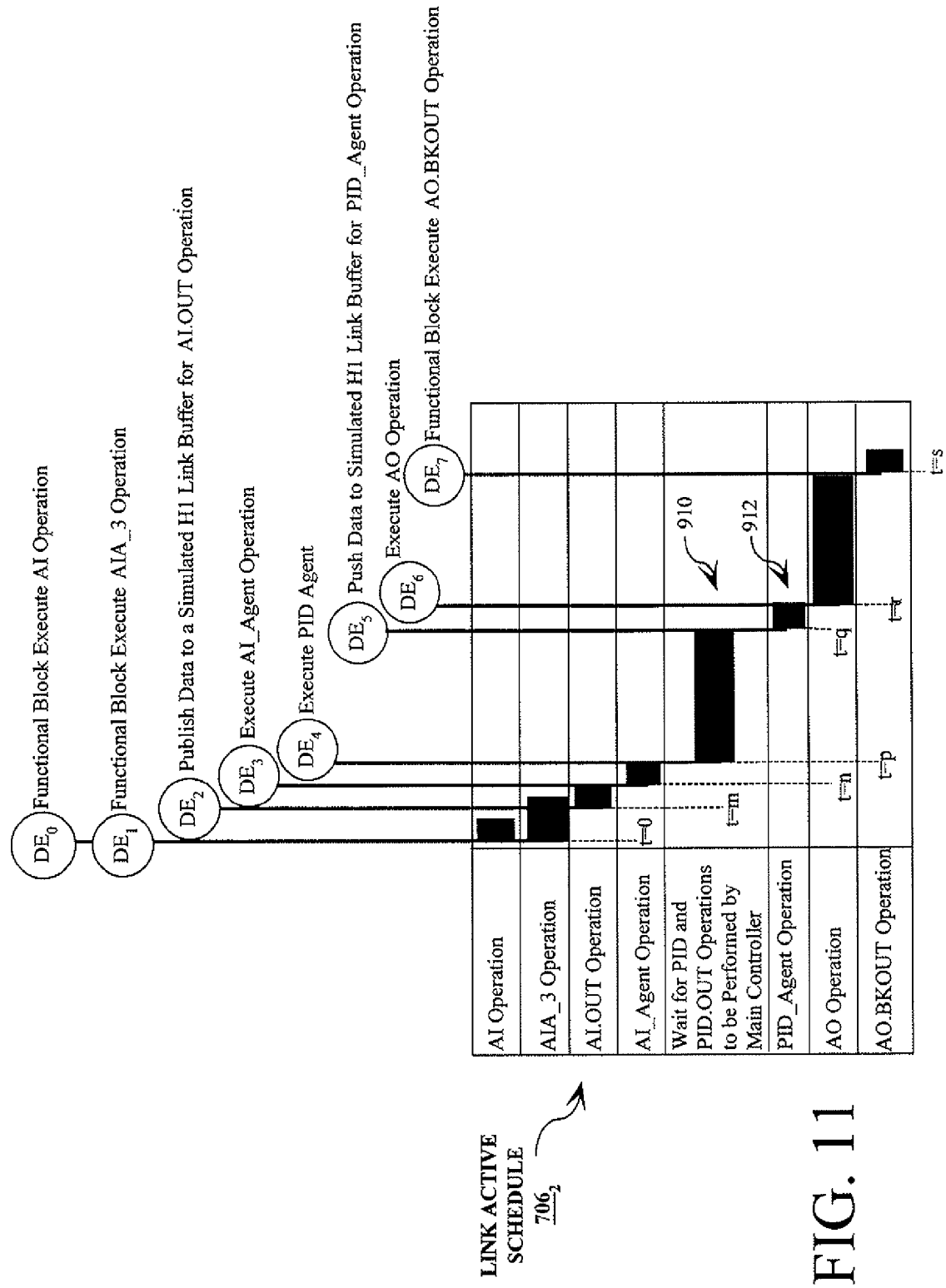
FIG. 11 is a schematic illustration of a Link Active Schedule and a corresponding intermediate FF structure according to embodiment of the invention.

Referring now to FIG. 10, there is provided a flow diagram of an exemplary functional block execution process 1000 performed by the simulation program. Process 1000 can be performed in step 422 of FIG. 4B. As shown in FIG. 10, the process 1000 begins with step 1002 and continues to step 1004. In step 1004, at least one Link Active Schedule is obtained. Thereafter, step 1006 is performed where the Link Active Schedule is converted to an intermediate FF structure. The intermediate FF structure comprises a plurality of discrete events. Step 1004 can be implemented by an event generator (not shown). The event generator can comprise hardware and/or software configured for converting Link Active Schedules into at least one intermediate FF structure. A schematic illustration of a Link Active Schedule and a corresponding intermediate FF structure is provided in FIG. 11.

After completing step 1006, the process 1000 continues with step 1008. In step 1008, the FF structure is interpreted and the discrete events are executed. The discrete events are executed by calling software operations for facilitating executions of the discrete events. Sets of events can include, but are not limited to, publishing data to a simulated H1 Link Buffer and pushing data to a simulated H1 Link Buffer. The discrete event executions are performed in accordance with the timing parameters corresponding to the discrete events. For example, first and second discrete events $DE_0$, $DE_1$ are performed at time t=0. A third discrete event $DE_3$ is performed at time t=m, and so on. After executing the discrete events, step 1010 is performed where the process 1000 ends.

The following example is provided in order to further illustrate the present invention. The scope of the invention, however, is not to be considered limited in any way thereby.

Example 1

The following description of an exemplary functional block execution process performed by the simulation program assumes that the simulation computer model 500 of FIG. 5 and the Link Active Schedule 706₂ of FIG. 9B are utilized by the simulation program for simulating a control strategy 702 of FIG. 7. In such a scenario, the following functional block executions will occur as defined by the Link Active Schedule 706₂:

(1) functional block 506 executions of AI Operation and AIA_3 Operation stating at time t=0 milliseconds;
(2) functional block 506 execution of AI.Out Operation at time t=m milliseconds;
(3) functional block 502 execution of AI_Agent Operation at time t=n milliseconds;
(4) wait a pre-defined period of time starting at time t=p;
(5) functional block 503 execution of PID_Agent Operation at time t=q milliseconds;
(6) functional block 506 execution of AO Operation at time t=r milliseconds; and
(7) functional block 506 execution of AO.BKOut Operation at time t=s milliseconds.

As a result of performing the above listed functional block executions, the control strategy 702 is simulated by the simulation program.

In light of the forgoing description of the invention, it should be recognized that the present invention can be realized in hardware, software, or a combination of hardware and software. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following: (a) conversion to another language, code or notation; (b) reproduction in a different material form. Additionally, the description above is intended by way of example only and is not intended to limit the present invention in any way, except as set forth in the following claims.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

We claim:

1. A method for event based execution of at least one Fieldbus process control strategy (FPCS) for simulation of an industrial process at least partially implemented by a Fieldbus system including at least one Fieldbus Interface Module (FIM) and a plurality of field devices, comprising the steps of:
   representing an implementation of said FPCS as a Fieldbus data structure comprising a plurality of operational blocks representing operations of said FIM and operations of at least one of said plurality of field devices;
   obtaining at least one Link Active Schedule (LAS) for simulating operations of said at least one field device using said Fieldbus data structure, said LAS comprising software operation identifiers for software implementations of said operations of said field device and timing parameters for performing said software implementations;
   converting said LAS to an intermediate structure comprising a plurality of discrete events, said converting including generating timing parameters corresponding to each of said plurality of discrete events including a plurality of different times, and
   running simulation software installed on a computing device by performing functional block executions for said plurality of discrete events with a simulation sequence for said plurality of discrete events based on said timing parameters for simulating said operations of said industrial process.

2. The method according to claim 1, wherein each of said timing parameters comprise at least one of a start time for performing a software implementation and a duration for performing said software implementation.

3. The method according to claim 1, wherein said LAS further comprises software operation identifiers for software implementations of said operations for said FIM.

4. The method according to claim 1, further comprising the step of creating a simulation computer model of a Fieldbus system configuration.

5. The method according to claim 4, wherein said simulation computer model comprises at least one functional block representing said at least one field device and at least one interconnection between said functional block and said FIM, said functional block configured for executing said software implementations of said operations of said at least one field device.

6. The method according to claim 4, wherein said simulation computer model comprises a functional block configured for executing software implementations of said operations of said at least one FIM, a plurality of functional blocks configured for executing software implementations of operations of said plurality of field devices, and a plurality of interconnections between said functional blocks.

7. The method according to claim 1, wherein said computing device is an embedded box, a FIM, or a simulation computer system.

8. A Fieldbus based simulation system configured for simulating a Fieldbus process control strategy (FPCS) of an industrial process at least partially implemented by a Fieldbus system including at least one Fieldbus Interface Module (FIM) and a plurality of field devices, comprising:

a storage device having at least one converted Link Active Schedule (LAS) stored therein, said converted LAS configured for simulating operations of at least one of said plurality of field devices, said converted LAS comprising software operation identifiers for software implementations of said operations of said field device and timing parameters for performing said software implementations, wherein said converted LAS includes an intermediate structure comprising a plurality of discrete events, and timing parameters corresponding to each of said plurality of discrete events including a plurality of different times;

and a computing device communicatively coupled to said storage device and configured for performing functional block executions for said plurality of discrete events with a simulation sequence for said plurality of discrete events based on said timing parameters for simulating said operations of said industrial process.

9. The Fieldbus based simulation system of claim 8, wherein said converted LAS is created using a Fieldbus data structure representing an implementation of said FPCS, said Fieldbus data structure comprising a plurality of operational blocks representing operations of said FIM and operations of at least one of said plurality of field devices.

10. The Fieldbus based simulation system of claim 8, wherein each of said timing parameters comprise at least one of a start time for performing a software implementation of said software implementations and a duration for performing said software implementation.

11. The Fieldbus based simulation system of claim 8, wherein said converted LAS further comprises software operation identifiers for software implementations of said operations for said at least one FIM.

12. The Fieldbus based simulation system of claim 8, wherein said simulation software is further configured for using a simulation computer model of a Fieldbus system configuration for performing said functional block executions.

13. The Fieldbus based simulation system of claim 12, wherein said simulation computer model comprises at least one functional block representing said at least one field device and at least one interconnection between said functional block and said FIM, said functional block configured for executing said software implementations of said operations of said at least one field device.

14. The Fieldbus based simulation system of claim 12, wherein said simulation computer model comprises a functional block configured for executing software implementations of said operations of said at least one FIM, a plurality of functional blocks configured for executing software implementations of operations of said plurality of field devices, and a plurality of interconnections between said functional blocks.

15. The Fieldbus based simulation system of claim 8, wherein said computing device is an embedded box, a FIM, or a simulation computer system.

* * * * *